(12) United States Patent
Goel et al.

(10) Patent No.: US 9,976,785 B2
(45) Date of Patent: May 22, 2018

(54) LIQUID LINE CHARGE COMPENSATOR

(71) Applicant: Lennox Industries Inc., Richardson, TX (US)

(72) Inventors: Rakesh Goel, Irving, TX (US); Eric Berg, The Colony, TX (US); Mark Olsen, Carrollton, TX (US); Ian Burmania, Rockwall, TX (US)

(73) Assignee: Lennox Industries Inc., Richardson, TX (US)

(*) Notice: Subject to any disclaimer, the term of this patent is extended or adjusted under 35 U.S.C. 154(b) by 595 days.

(21) Appl. No.: 14/279,043

(22) Filed: May 15, 2014

(65) Prior Publication Data

US 2015/0330684 A1 Nov. 19, 2015

(51) Int. Cl.
*F25B 41/00* (2006.01)
*F16L 55/02* (2006.01)
(Continued)

(52) U.S. Cl.
CPC ............ *F25B 41/003* (2013.01); *F16L 55/02* (2013.01); *F25B 41/04* (2013.01); *F25B 45/00* (2013.01);
(Continued)

(58) Field of Classification Search
CPC ...... F25B 41/003; F25B 45/00; F25B 49/005; F25B 41/04; F25B 3/20; F16L 52/02; G05D 16/2006
See application file for complete search history.

(56) References Cited

U.S. PATENT DOCUMENTS 3,563,304 A * 2/1971 McGrath ............. F24D 11/0257
165/240
3,777,508 A * 12/1973 Imabayashi ............ F24F 3/153
165/240
(Continued)

FOREIGN PATENT DOCUMENTS

DE 10317551 B3 4/2004
EP 1821048 A2 8/2007
(Continued)

OTHER PUBLICATIONS

Lattanzi, Matt and Priestley, Doug, Micro-Channel Evaporator-Coil Technology. RSES Journal [online], Oct. 2012, pp. 14-18, [retrieved on Sep. 30, 2017]. Retrieved from the internet <URL: https://www.rses.org/assets/rses_journal/1012_Evaporators.pdf>.*
(Continued)

*Primary Examiner* — Ljiljana Ciric
(74) *Attorney, Agent, or Firm* — Winstead PC

(57) ABSTRACT

An apparatus for reducing discharge pressure includes a compensator reservoir and a compensator line. The compensator line connects the compensator reservoir and a liquid line. The liquid line connects an outdoor heat exchanger and an indoor heat exchanger of a reversible HVAC system. The compensator line includes a connection to the compensator reservoir and a connection to the liquid line. A first expansion device is disposed in the liquid line and configured to only act on refrigerant flowing towards the outdoor heat exchanger. A second expansion device disposed in the liquid line and configured to only act on refrigerant flowing towards the indoor heat exchanger. The compensator is operable to receive refrigerant, driven by pressure, from the HVAC system, and further operable to allow refrigerant to flow back into the HVAC system.

8 Claims, 5 Drawing Sheets

(51) Int. Cl.
*F25B 41/04* (2006.01)
*F25B 45/00* (2006.01)
*F25B 49/00* (2006.01)

(52) U.S. Cl.
CPC ...... *F25B 49/005* (2013.01); *F25B 2341/065* (2013.01); *F25B 2341/0662* (2013.01); *F25B 2400/16* (2013.01); *F25B 2500/07* (2013.01); *F25B 2500/26* (2013.01); *Y10T 137/0396* (2015.04); *Y10T 137/86381* (2015.04)

(56) References Cited

U.S. PATENT DOCUMENTS

| | | | | |
|---|---|---|---|---|
| 4,030,315 A * | 6/1977 | Harnish | ............... | F25B 13/00 62/324.4 |
| 4,215,555 A * | 8/1980 | Cann | ............... | F25B 13/00 62/324.2 |
| 4,242,873 A * | 1/1981 | Hino | ............... | F24D 11/0221 62/235.1 |
| 4,522,037 A * | 6/1985 | Ares | ............... | F25B 5/02 62/196.4 |
| 4,551,983 A * | 11/1985 | Atsumi | ............... | F25B 41/00 62/174 |
| 4,655,051 A * | 4/1987 | Jones | ............... | F25B 13/00 62/324.4 |
| 4,766,734 A * | 8/1988 | Dudley | ............... | F24D 17/02 62/160 |
| 4,771,610 A * | 9/1988 | Nakashima | ............... | F25B 5/00 62/160 |
| 4,861,561 A | 8/1989 | Pritchard | | |
| 4,942,743 A * | 7/1990 | Gregory | ............... | F25B 13/00 62/503 |
| 5,042,271 A * | 8/1991 | Manz | ............... | F25B 43/02 62/470 |
| 5,117,645 A * | 6/1992 | Bryant | ............... | F25B 41/065 62/174 |
| 5,136,855 A * | 8/1992 | Lenarduzzi | ............... | F24J 3/081 62/129 |
| 5,159,817 A * | 11/1992 | Hojo | ............... | F24F 3/065 62/199 |
| 5,548,971 A * | 8/1996 | Rockenfeller | ............... | F25B 15/02 62/324.2 |
| 5,628,200 A * | 5/1997 | Pendergrass | ............... | F24F 3/06 62/197 |
| 5,651,263 A * | 7/1997 | Nonaka | ............... | F25B 9/006 62/205 |
| 5,651,265 A * | 7/1997 | Grenier | ............... | F24J 3/081 165/45 |
| 5,653,120 A * | 8/1997 | Meyer | ............... | F24D 15/04 62/324.4 |
| 5,758,514 A * | 6/1998 | Genung | ............... | F24J 3/086 62/324.4 |
| 5,802,859 A * | 9/1998 | Zugibe | ............... | F25B 45/00 62/125 |
| 5,848,537 A * | 12/1998 | Biancardi | ............... | F04C 29/0007 62/324.6 |
| 5,896,754 A | 4/1999 | Balthazard et al. | | |
| 5,937,665 A * | 8/1999 | Kiessel | ............... | F24F 5/0046 62/260 |
| 6,470,704 B2 | 10/2002 | Shibata et al. | | |
| 6,904,963 B2 | 6/2005 | Hu | | |
| 8,051,675 B1 * | 11/2011 | Carlson | ............... | F25B 43/00 165/104.25 |
| 8,602,093 B2 | 12/2013 | Iwasaki | | |
| 9,599,380 B2 * | 3/2017 | Yamashita | ............... | F25B 45/00 |
| 9,618,237 B2 * | 4/2017 | Kim | ............... | F25B 13/00 |
| 9,644,906 B2 * | 5/2017 | Shimamoto | ............... | F28F 27/02 |
| 9,651,287 B2 * | 5/2017 | Morimoto | ............... | F25B 49/02 |
| 9,664,191 B2 * | 5/2017 | Tanaka | ............... | F04C 18/34 |
| 9,732,992 B2 * | 8/2017 | Yamashita | ............... | F25B 29/003 |
| 9,777,950 B2 * | 10/2017 | Uselton | ............... | F25B 1/06 |
| 9,823,000 B2 | 11/2017 | Wang | | |
| 9,834,063 B2 | 12/2017 | Kang et al. | | |
| 9,855,821 B2 | 1/2018 | Kang et al. | | |
| 2002/0003037 A1 * | 1/2002 | Cousineau | ............... | B23Q 11/126 165/278 |
| 2004/0000153 A1 * | 1/2004 | Bagley | ............... | F25B 41/04 62/140 |
| 2004/0025526 A1 * | 2/2004 | Aflekt | ............... | F24F 3/1405 62/324.1 |
| 2004/0148956 A1 * | 8/2004 | Arshansky | ............... | F25B 9/008 62/335 |
| 2005/0066678 A1 * | 3/2005 | Kamimura | ............... | F25B 29/003 62/238.7 |
| 2005/0120733 A1 * | 6/2005 | Healy | ............... | F25B 1/04 62/324.4 |
| 2005/0132728 A1 | 6/2005 | Lifson et al. | | |
| 2006/0010899 A1 * | 1/2006 | Lifson | ............... | F25B 13/00 62/324.1 |
| 2006/0123834 A1 * | 6/2006 | Hwang | ............... | F25B 13/00 62/470 |
| 2007/0193285 A1 * | 8/2007 | Knight | ............... | F25B 43/04 62/126 |
| 2008/0034777 A1 * | 2/2008 | Copeland | ............... | F25B 13/00 62/323.1 |
| 2008/0104975 A1 * | 5/2008 | Gorbounov | ............... | F25B 41/043 62/117 |
| 2008/0296005 A1 * | 12/2008 | Taras | ............... | F25B 13/00 165/173 |
| 2008/0314064 A1 * | 12/2008 | Al-Eidan | ............... | F25B 13/00 62/324.6 |
| 2009/0211283 A1 * | 8/2009 | Koh | ............... | F24F 5/0017 62/259.1 |
| 2009/0229285 A1 * | 9/2009 | Sato | ............... | F25B 41/00 62/149 |
| 2009/0229300 A1 * | 9/2009 | Fujimoto | ............... | F25B 1/10 62/470 |
| 2009/0241569 A1 * | 10/2009 | Okada | ............... | F25B 13/00 62/196.1 |
| 2010/0064710 A1 * | 3/2010 | Slaughter | ............... | F24D 11/0214 62/238.7 |
| 2010/0218513 A1 * | 9/2010 | Vaisman | ............... | F01K 7/32 62/6 |
| 2010/0326075 A1 * | 12/2010 | Fong | ............... | F01K 25/06 60/650 |
| 2011/0041523 A1 | 2/2011 | Taras et al. | | |
| 2011/0146321 A1 * | 6/2011 | Jin | ............... | F25B 13/00 62/324.6 |
| 2011/0154848 A1 * | 6/2011 | Jin | ............... | F24D 3/18 62/324.6 |
| 2011/0192176 A1 * | 8/2011 | Kim | ............... | F24F 3/065 62/115 |
| 2011/0197600 A1 * | 8/2011 | Hamada | ............... | F24H 4/04 62/79 |
| 2012/0111042 A1 * | 5/2012 | Hamada | ............... | F25B 47/025 62/157 |
| 2012/0227426 A1 * | 9/2012 | Deaconu | ............... | F25B 1/10 62/115 |
| 2012/0227429 A1 * | 9/2012 | Louvar | ............... | F25B 23/006 62/196.1 |
| 2012/0324911 A1 * | 12/2012 | Shedd | ............... | F25B 25/00 62/62 |
| 2013/0174595 A1 * | 7/2013 | Okuda | ............... | F25B 13/00 62/238.6 |
| 2014/0311172 A1 * | 10/2014 | Iwasaki | ............... | F24F 1/06 62/151 |
| 2014/0326018 A1 * | 11/2014 | Ignatiev | ............... | F25B 49/02 62/510 |
| 2014/0345310 A1 * | 11/2014 | Tamaki | ............... | F25B 13/00 62/238.6 |
| 2015/0020536 A1 * | 1/2015 | Lee | ............... | F25B 13/00 62/324.4 |
| 2015/0040594 A1 * | 2/2015 | Suzuki | ............... | B60H 1/00899 62/159 |
| 2015/0089967 A1 * | 4/2015 | Kim | ............... | B60H 1/00007 62/238.6 |
| 2015/0267925 A1 * | 9/2015 | Inada | ............... | F25B 13/00 62/509 |

(56) References Cited

U.S. PATENT DOCUMENTS

| | | | | |
|---|---|---|---|---|
| 2015/0276271 A1* | 10/2015 | Uselton | ............... | F25B 1/06 |
| | | | | 62/115 |
| 2015/0276290 A1* | 10/2015 | Aoyama | ............... | F25B 13/00 |
| | | | | 62/115 |
| 2016/0195311 A1* | 7/2016 | Li | ............... | F25B 13/00 |
| | | | | 62/115 |
| 2016/0273795 A1* | 9/2016 | Takenaka | ............... | F24F 13/30 |

FOREIGN PATENT DOCUMENTS

| | | |
|---|---|---|
| JP | 11248266 | 9/1999 |
| JP | 2002195705 | 7/2002 |
| WO | 94/14016 A1 | 6/1994 |

OTHER PUBLICATIONS

"Microchannel Coil Servicing Guidelines: Trane Unitary Light and Commercial Units", Trane [onilne], May 5, 2011, p. 1-16, [retrieved on Sep. 30, 2017]. Retrieved from the internet <https://www.trane.com/content/dam/Trane/Commercial/lar/es/product-systems/comercial/Rooftops/Accesorios-Rooftops/IOM/Microchannel%20IOM%20(Ingl%C3%A9s).pdf>.*

* cited by examiner

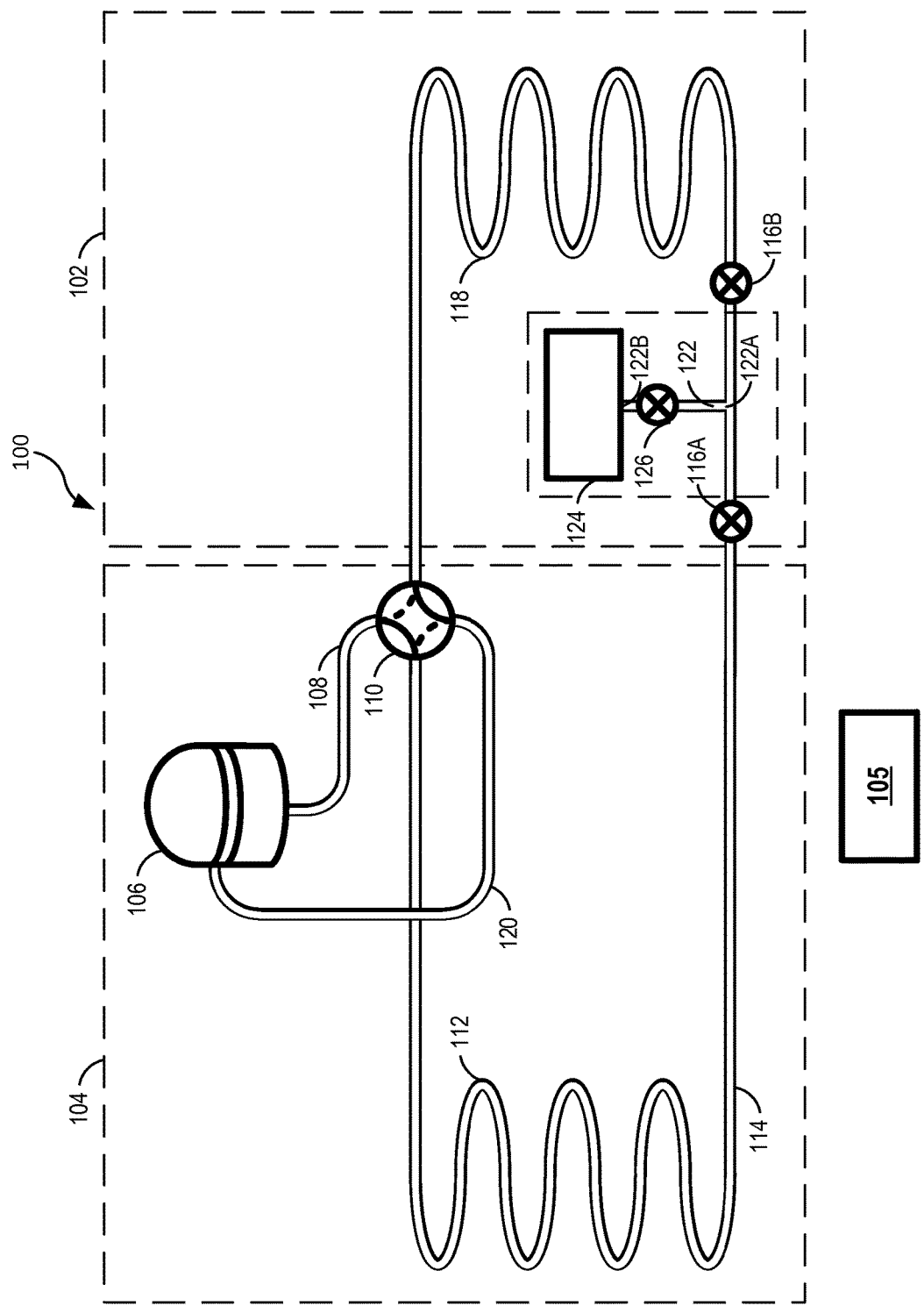

LIQUID LINE CHARGE COMPENSATOR

FIELD OF THE INVENTION

The present invention relates to Heating, Ventilating, and Air Conditioning (HVAC) systems and, more particularly, to preventing high discharge pressure trips.

BACKGROUND

One problem in Heating, Ventilation, and Air Conditioning (HVAC) systems is high discharge pressure. Discharge pressure refers to the pressure generated on the output side of a compressor. The current solution to address high discharge pressure is a pressure switch. When the discharge pressure exceeds a pressure threshold, the switch opens shutting down the HVAC system. This event is called a "high discharge pressure trip." The HVAC system may have multiple high discharge pressure trips until the discharge pressure is normalized.

High discharge pressure trips most commonly occur during startup operation or high outdoor ambient operation. A common cause of high discharge pressure trips during startup operation is a closed expansion device. An expansion device controls the amount of refrigerant flow through a liquid line to a heat exchanger. An expansion device may be closed if the HVAC system has been off for a long period of time and under low pressure. The expansion device often takes time to open up, creating high pressure behind it in the liquid line. The high pressure in the liquid line can cause a pressure trip. Besides startup, high outdoor ambient operation can cause high discharge pressure trips. When there is high outdoor ambient temperature the compressor must perform more work to compress the refrigerant from the low evaporator side pressure to the high condenser side pressure. The added work performed by the compressor raises the discharge pressure and may cause a high discharge pressure trip.

Certain HVAC systems use a microchannel condenser and a tandem compressor to deliver higher Integrated Energy Efficiency Ratio (IEER). An HVAC system with both a microchannel condenser and a tandem compressor are especially likely to have high discharge pressure trips. This type of HVAC system is optimized for part load conditions when an additional one to two pounds of refrigerant charge is present over the optimum refrigerant charge for full load conditions. When under full load conditions, unnecessary refrigerant is present in the HVAC system. The additional refrigerant charge can cause high discharge pressure spikes and consistently higher discharge pressure. Either condition can result in a high discharge pressure trip during high outdoor ambient operation. Accordingly, an improved configuration would be desirable to reduce the likelihood of high discharge pressure and prevent high discharge pressure trips.

SUMMARY

In an embodiment, an apparatus for reducing discharge pressure is provided. The apparatus has a compensator reservoir and a compensator line. The compensator line connects the compensator reservoir and a liquid line. The liquid line connects a condenser and an evaporator. The compensator line has a connection to the compensator reservoir and a connection to the liquid line.

In another embodiment, a method for reducing discharge pressure is provided. A controller checks for one or more conditions indicating a likelihood of high discharge pressure. The controller finds a condition indicating a likelihood of high discharge pressure. In response to finding the condition, the controller closes a compensator valve after a set amount of time. The controller reopens the compensator valve.

DESCRIPTION OF DRAWINGS

For a more complete understanding of the present invention and the advantages thereof, reference is now made to the following Detailed Description taken in conjunction with the accompanying drawings, in which:

FIG. 1B depicts a Heating, Ventilation, and Air Conditioning (HVAC) system with a charge compensator apparatus located in the ambient environment of the indoor heat exchanger;

DETAILED DESCRIPTION

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

Figure 1A:
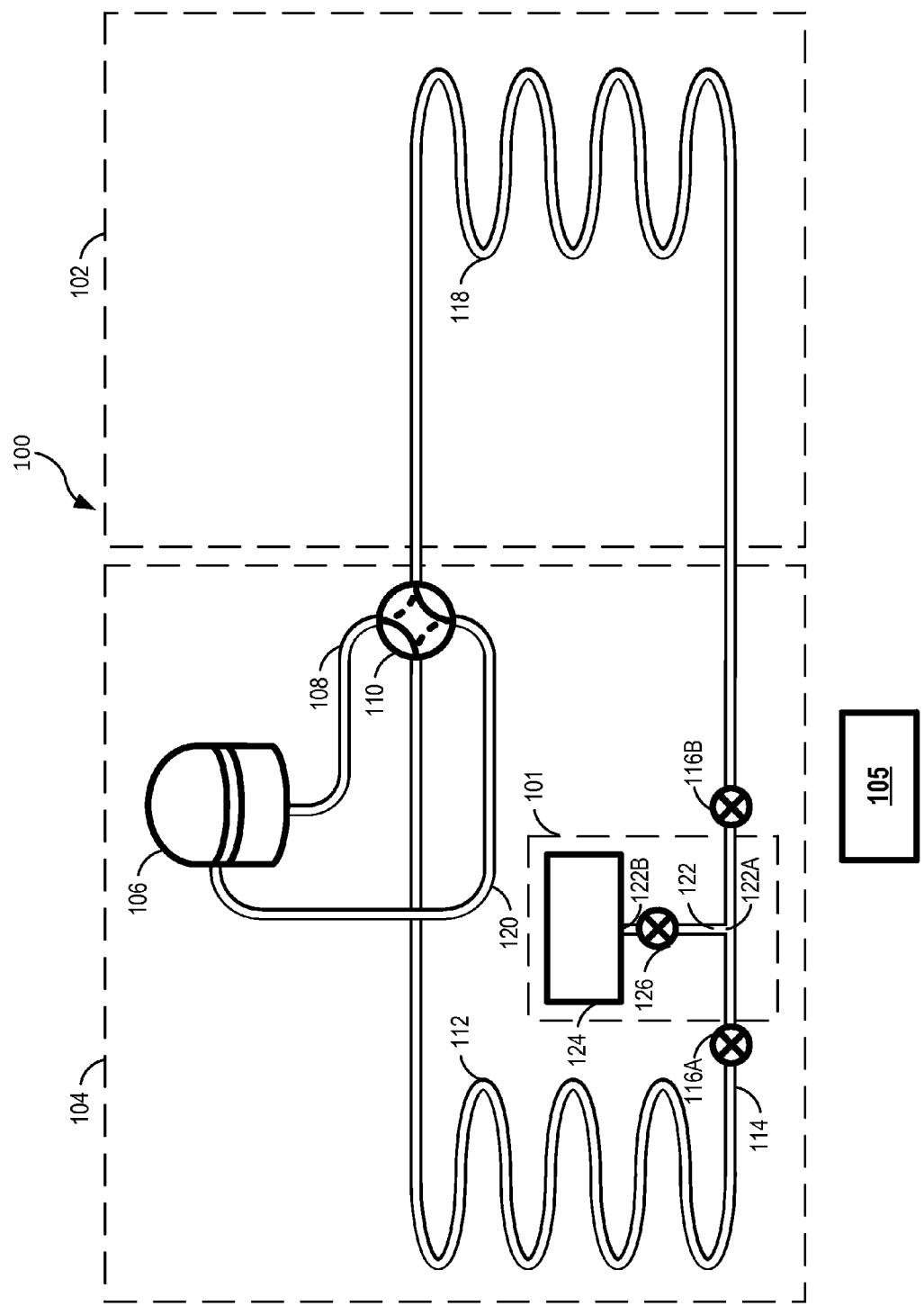
FIG. 1A depicts a Heating, Ventilation, and Air Conditioning (HVAC) system with a charge compensator apparatus located in the ambient environment of the outdoor heat exchanger.

FIG. 1A depicts a Heating, Ventilation, and Air Conditioning (HVAC) system 100 with a liquid line charge compensator apparatus 101. The HVAC system 100 may comprise an indoor unit 102, an outdoor unit 104, and a controller 105. The indoor unit 102 resides inside a structure to be heated or cooled, such as a building or refrigerator. Similarly, the outdoor unit 104 resides outside the structure. Generally, residential HVAC systems operate with this particular combination of an indoor unit and an outdoor unit. Besides residential HVAC systems, the combination can be used in other applications such as commercial rooftop package units and refrigeration.

In the absence of high discharge pressure, the HVAC system 100 may operate conventionally. A continuous flow of refrigerant charge travels in a loop, called a vapor compression cycle, through the HVAC system 100. A compressor 106 compresses a refrigerant in gas vapor form, then discharges the refrigerant vapor through a discharge line 108. The compressed refrigerant gas vapor enters a reversing valve 110. The reversing valve 110 can change between a cooling configuration, shown by solid lines, and a heating configuration, shown by dashed lines.

In the cooling configuration, the refrigerant flows from the reversing valve 110 to an outdoor heat exchanger 112. The refrigerant flows through the outdoor heat exchanger 112, releasing heat into the outdoor air. The refrigerant condenses into a liquid as it flows through the outdoor heat exchanger 112. From the outdoor heat exchanger 112, the liquid refrigerant flows through a liquid line 114.

The liquid line 114 has an expansion device 116A and an expansion device 116B. Either the expansion device 116A or expansion device 116B reduces the pressure of the refrigerant by expanding the liquid refrigerant flowing through the liquid line 114. Due to check valves or the like, the expansion device 116A only acts on refrigerant flowing toward the outdoor heat exchanger 112, and the expansion device 116B only acts on refrigerant flowing toward an indoor heat exchanger 118.

When the HVAC system 100 is in the cooling configuration, liquid refrigerant bypasses the expansion device 116A and continues toward the expansion device 116B. The expansion device 116B reduces the pressure of the liquid refrigerant flowing through it. The liquid refrigerant then flows through an indoor heat exchanger 118, absorbing heat from the structure and evaporating into a gas vapor. The refrigerant then flows to the reversing valve 110, where it is directed through a suction line 120 and back into the compressor 106 to be compressed again.

In the heating configuration, the refrigerant flows from the reversing valve 110 to the indoor heat exchanger 118. The refrigerant flows through the indoor heat exchanger 118, releasing heat into a structure. The refrigerant condenses into a liquid as it flows through the indoor heat exchanger 118. From the indoor heat exchanger 118, the liquid refrigerant flows through the liquid line 114. The liquid refrigerant bypasses the expansion device 116B and flows to the expansion device 116A. The expansion device 116A reduces the pressure of the liquid refrigerant flowing through it. The refrigerant then flows through the outdoor heat exchanger 112, absorbing heat from the outdoor air and evaporating into a gas vapor. The refrigerant then flows to the reversing valve 110, where it is directed through the suction line 120 and back into the compressor 106 to be compressed again.

The outdoor heat exchanger 112 may be called an outdoor coil. The indoor heat exchanger 118 may be called an indoor coil. During cooling, the outdoor heat exchanger 112 may be called a condenser and the indoor heat exchanger 118 may be called an evaporator. During heating, the outdoor heat exchanger 112 may be called the evaporator and the indoor heat exchanger 118 may be called the condenser. The expansion devices 116A and 116B may be expansion valves.

HVAC system 100 is capable of both heating and cooling. An HVAC system that can perform both may be called a heat pump. An air conditioner or heater may be substituted for HVAC system 100. An air conditioner is an HVAC system which is capable of only cooling. A heater is an HVAC system which is capable of only heating.

In an HVAC system that is capable of either heating or cooling, but not both, the reversing valve 110 is unnecessary since the direction of refrigerant flow does not reverse. The expansion device 116A is also unnecessary in an air conditioner because refrigerant does not flow through the liquid line 114 toward the outdoor heat exchanger 112. Likewise, the expansion device 116B is also unnecessary in a heater because refrigerant does not flow through liquid line 114 toward indoor heat exchanger 118.

The charge compensator apparatus 101 may comprise a compensator line 122, a charge compensator reservoir 124, and a compensator valve 126. The charge compensator apparatus 101 may be located between the expansion device 116A and the expansion device 116B. The compensator line 122 may connect the liquid line 114 to the charge compensator reservoir 124. Connection 122A may be the connection between the compensator line 122 and the liquid line 114. Connection 122B may be the connection between the compensator line 122 and the charge compensator reservoir 124. The charge compensator reservoir 124 may be a tank which holds excess refrigerant. The charge compensator reservoir 124 may be made of steel. Connection 122B may be vertically higher than connection 122A, so that gravity may drain refrigerant from charge compensator reservoir 124 into liquid line 114.

The compensator valve 126 may be positioned on the compensator line 122. The compensator valve 126 may be opened, to permit the flow of refrigerant through the compensator line 122, or closed, to block the flow of refrigerant through the compensator line 122. The compensator valve 126 may be a solenoid valve.

When compensator valve 126 is open, relatively high pressure in liquid line 114 may cause refrigerant to migrate into charge compensator reservoir 124. Lower pressure in liquid line 114 may cause refrigerant to drain from charge compensator reservoir 124 into liquid line 114. Compensator valve 126 may be closed to keep the refrigerant from draining.

The controller 105 may operate the compensator valve 126. Where the compensator valve 126 is a solenoid valve, the controller 105 may send current through the compensator valve 126 directly or send a signal that causes current to be sent through the compensator valve 126. The controller 105 may be a unit controller that controls the overall operation of the indoor unit 102 and the outdoor unit 104, or may be a separate controller that only controls when the compensator valve 126 opens and closes.

In FIG. 1A, the charge compensator reservoir 124 is shown inside the outdoor unit 104. More generally, FIG. 1A shows the charge compensator reservoir 124 in the ambient environment of the outdoor heat exchanger 112. As shown by FIG. 1B, the charge compensator reservoir 124 may also be located inside the indoor unit 102. More generally, FIG. 1B shows the charge compensator reservoir 124 in the ambient environment of the indoor heat exchanger 118.

During cooling, the charge compensator reservoir 124 in FIG. 1A is in the ambient environment of the condenser. During heating, the charge compensator reservoir 124 in FIG. 1A is in the ambient environment of the evaporator. During cooling, the charge compensator reservoir 124 in FIG. 1B is in the ambient environment of the evaporator. During heating, the charge compensator reservoir 124 in FIG. 1B is in the ambient environment of the condenser.

The location of the charge compensator reservoir 124 in FIG. 1A may be upstream or downstream of the outdoor heat exchanger 112. The location of the charge compensator reservoir 124 in FIG. 1B may be upstream or downstream of the indoor heat exchanger 118. The charge compensator reservoir 124 is "upstream" of a heat exchanger when air flows past the charge compensator 124 before flowing past the heat exchanger. The charge compensator reservoir 124 is "downstream" of a heat exchanger when air flows past the charge compensator reservoir 124 after flowing past the heat exchanger.

The location of the charge compensator reservoir 124 may affect the temperature of the charge compensator reservoir. When charge compensator reservoir 124 is hotter, more pressure may be needed in liquid line 114 to fill the charge compensator reservoir 124, but less pressure may be needed in liquid line 114 to drain charge compensator reservoir 124. The ambient environment of the condenser is generally hotter than the ambient environment of the evaporator. Air flowing past the condenser may be additionally heated, while air flowing past the evaporator may be additionally cooled. Generally speaking, the possible locations of the charge compensator reservoir 124 are, in order from hottest to coldest, (1) in the ambient environment of the condenser, downstream of the condenser, (2) in the ambient environment of the condenser, upstream of the condenser, (3) in the ambient environment of the evaporator, upstream of the evaporator, and (4) in the ambient environment of the evaporator, downstream of the evaporator.

The desired location of the charge compensator reservoir 124 may be application dependent. The desired location of the charge compensator reservoir 124 may depend on pressure conditions in the liquid line 114 or be based on a need of a particular HVAC system to have a certain fill or drain rate. The desired location of the charge compensator reservoir 124 may be where the pressure in the charge compensator reservoir 124 would be the most consistent. The ambient temperature of the environment surrounding the charge compensator reservoir 124 may affect consistent state pressure.

Regardless of where the charge compensator reservoir 124 is located, the rest of the charge compensator apparatus 101 may be in the same location. The charge compensator apparatus 101 may be located between the expansion device 116A and the expansion device 116B, and the charge compensator apparatus 101 may be on the liquid line 114.

Figure 2A:
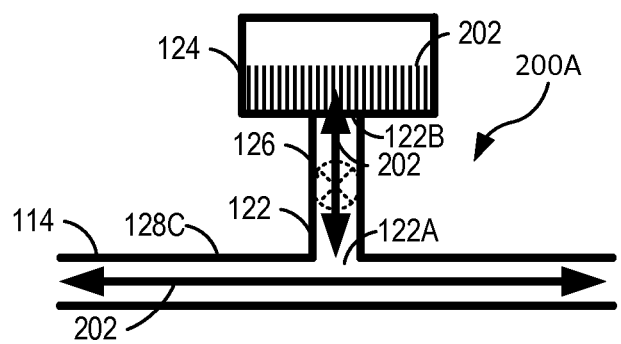
FIG. 2A depicts the charge compensator apparatus configured to fill or drain a charge compensator reservoir.

Referring to FIG. 2A, configuration 200A is a configuration of the charge compensator apparatus 101 which may fill or drain charge compensator reservoir 124. In configuration 200A the compensator valve 126 is left open as shown by the dotted lines. With the compensator valve 126 open, refrigerant 202 in liquid line 114 may enter or leave charge compensator reservoir 124 depending on the pressure in liquid line 114. High pressure in liquid line 114 may cause refrigerant 202 in liquid line 114 to migrate into the charge compensator reservoir 124. The refrigerant 202 entering charge compensator reservoir 124 reduces the pressure in the vapor compression cycle and can prevent a high discharge pressure trip.

When the pressure in liquid line 114 decreases sufficiently, the liquid refrigerant 202 that is located in the charge compensator reservoir 124 may gradually flow back down the compensator line 122 due to gravity, past the compensator valve 126, and back into the liquid line 114. Because configuration 200A depends on gravity, connection 122B should be placed vertically higher than connection 122A, so that gravity may drain refrigerant from charge compensator reservoir 124 into liquid line 114. In FIG. 2A, liquid refrigerant 202 would flow through liquid line 114 from left to right during cooling and from right to left during heating.

Figure 2B:
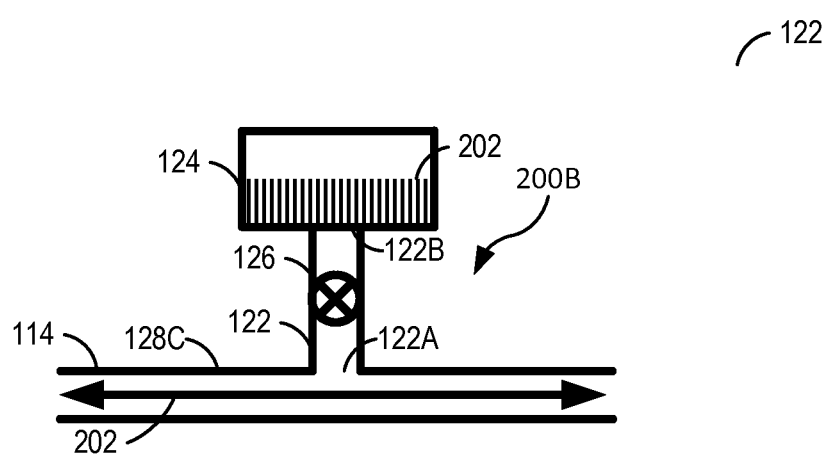
FIG. 2B depicts the charge compensator apparatus configured to hold refrigerant in a charge compensator reservoir.

Referring to FIG. 2B, configuration 200B is a configuration of the liquid line apparatus 101 which holds refrigerant 202 in charge compensator reservoir 124. In configuration 200B the compensator valve 126 is closed. Refrigerant 202 in charge compensator reservoir 124 is kept in reservoir 124 by the closed compensator valve 126. Compressor 106 may be a tandem compressor. A tandem compressor is comprised of two or more compressors. In a tandem compressor all of the compressors may run simultaneously, a portion of the compressors may operate, or only one compressor may operate at a time. When a tandem compressor uses less than all of the compressors, the tandem compressor is operating in part load. When a tandem compressor uses all of the compressors, the tandem compressor is operating at full load. Full load is generally a response to high outdoor ambient conditions, such as a 95° F. outdoor ambient temperature. When a tandem compressor starts all the compressors simultaneously, a higher amount of compression is created in a shorter amount of time compared to using only one compressor or the starting of a variable speed compressor at lower speed.

A tandem compressor system is often used with a microchannel condenser because together they deliver a high Integrated Energy Efficiency Ratio (IEER). Part load efficiency is important because the tandem compressor typically operate in part load unless there are high ambient conditions. Outdoor heat exchanger 112 and indoor heat exchanger 118 may each be microchannel heat exchangers. During air conditioning, outdoor heat exchanger 112 may be a microchannel condenser and indoor heat exchanger 118 may be a microchannel evaporator. During heating, indoor heat exchanger 118 may be a microchannel condenser and outdoor heat exchanger 112 may be a microchannel evaporator.

When in part load conditions, an HVAC system 100 with a tandem compressor is optimized when there is additional refrigerant charge, typically one to two pounds, over the optimum refrigerant charge for full load conditions. When an HVAC system 100 is optimized for part load conditions but operating in full load conditions, the additional refrigerant charge in the HVAC system 100 can cause a spike in discharge pressure. The spike in discharge pressure may lead to a high discharge pressure trip. High discharge pressure trips can also occur at part load conditions.

Figure 3:
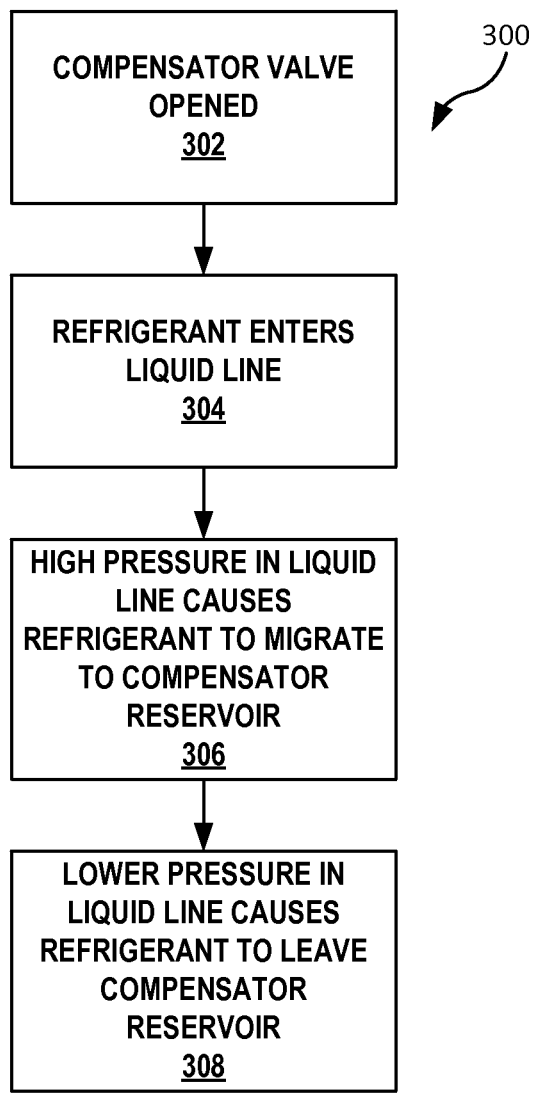
FIG. 3 depicts a method for reducing discharge pressure in an HVAC system.

FIG. 3 depicts a method 300 for reducing discharge pressure in an HVAC system 100. Method 300 may be performed when HVAC system 100 is started.

At 302, compensator valve 126 is opened. Charge compensator apparatus 101 is in configuration 200A. Alternately, compensator valve 126 may be absent, as it is not used in method 300. At 304, liquid refrigerant enters the liquid line as part of the vapor compression cycle. At 306, the liquid refrigerant may enter the charge compensator reservoir 124 due to high pressure in the liquid line 114. At 308, the liquid refrigerant may leave the charge compensator 124 due to gravity when the pressure in the liquid line 114 decreases.

Figure 4:
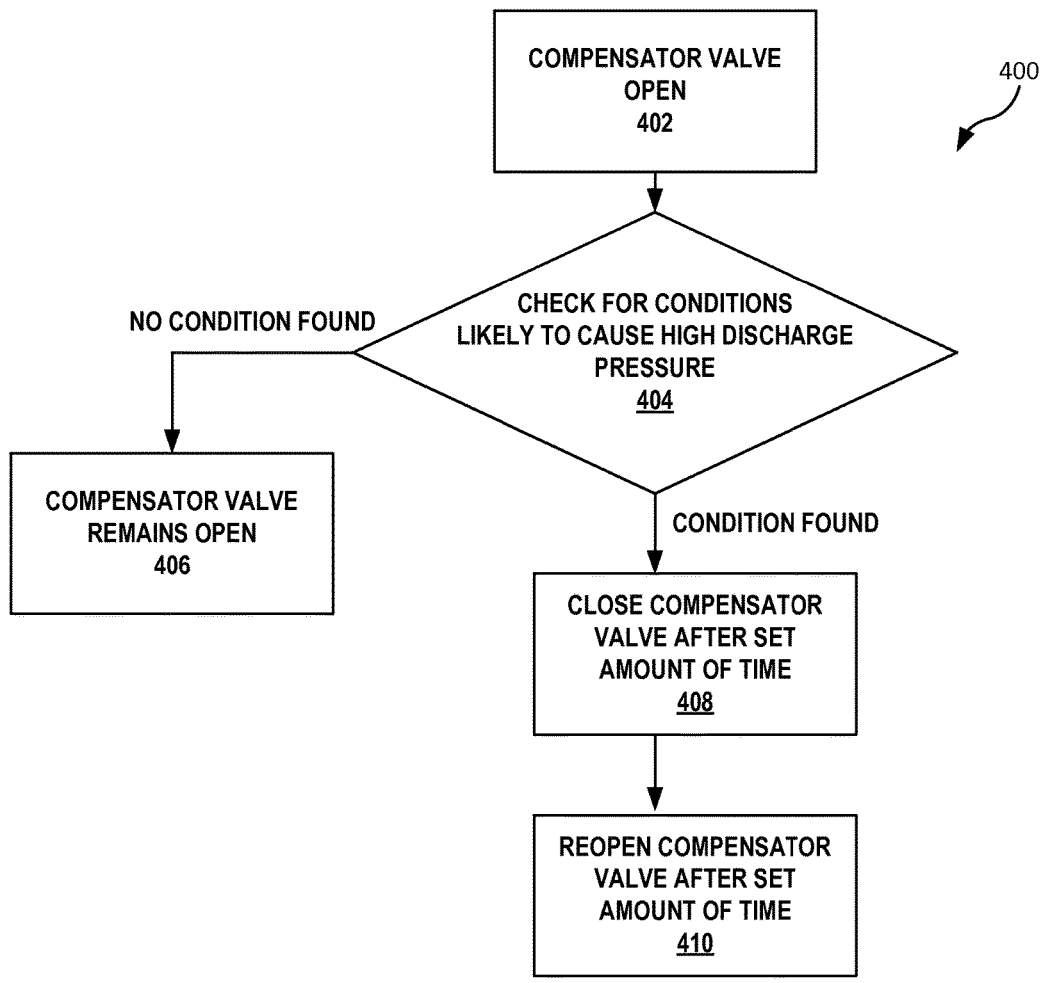
FIG. 4 depicts another method for reducing discharge pressure in an HVAC system.

FIG. 4 depicts a method 400 for reducing discharge pressure in an HVAC system 100. Controller 105 may perform method 400. In method 400, refrigerant may be removed from the vapor compression cycle and stored in reservoir 124. Method 400 may be performed when HVAC system 100 is started, and may also be performed periodically or continuously when HVAC system 100 is operating.

At 402, the compensator valve 402 may be open. Apparatus 101 may be in configuration 200A. Liquid refrigerant may enter the charge compensator reservoir 124 due to high pressure in the liquid line 114. At 404, controller 105 may check for a condition indicating a likelihood of high discharge pressure.

Many possible conditions may be checked for at 404. One condition may be outdoor ambient temperature being within a certain temperature range, such as between 105° F. and 125° F. Another condition may be a tandem compressor changing from part load operation to full load operation. Another condition may be HVAC system 100 being started after being off for more than a threshold amount of time, such as five minutes. Another condition may be HVAC system 100 being restarted following a high discharge pressure trip.

If no condition is found, then at 406 the compensator valve 126 may remain open. The liquid refrigerant may enter the charge compensator reservoir 124 due to high pressure in the liquid line 114. The liquid refrigerant may leave the charge compensator 124 due to gravity when the pressure in the liquid line 114 decreases.

If at least one condition is found, at 408, after a set amount of time the controller 105 may close the compensator valve 126. This set amount of time may range from five to sixty seconds. The apparatus 101 may enter configuration 200B. Compensator valve 126 may close off any liquid refrigerant currently in the charge compensator reservoir 124. At 410, the controller 105 may reopen the compensator valve 126 after another set amount of time. This set amount of time may range from one to 60 minutes. Alternately, the controller 105 may reopen the compensator valve 126 when the condition indicating a likelihood of high discharge pressure is no longer present. As another alternative, the controller 105 may reopen the compensator valve 126 when no conditions indicating a likelihood of high discharge pressure are present. As another alternative, the controller 105 may reopen the compensator valve 126 when a call for cooling ends.

When the compensator valve 126 opens, the apparatus 101 may enter configuration 200A. The liquid refrigerant may drain into liquid line 114. The liquid refrigerant may therefore be released back into the vapor compression cycle. After 406 or 410, the controller 105 may repeat method 400. The controller 105 may continue to repeat method 400 in a loop until HVAC system 100 is shut off.

The size of the charge compensator reservoir 124 may vary depending on the particular HVAC system. The reservoir should be large enough to accommodate the refrigerant removed from the vapor compression cycle during startup conditions and during high outdoor ambient conditions.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

We claim:

1. An apparatus for reducing discharge pressure, the apparatus comprising:

a compensator reservoir including a single connection to a single compensator line, the single compensator line fluidly coupled to the compensator reservoir and fluidly coupled to a liquid line, the liquid line connecting an outdoor heat exchanger and an indoor heat exchanger of a reversible heating, ventilation, and air conditioning (HVAC) system air conditioner, the single compensator line comprising the single connection to the compensator reservoir and a connection to the liquid line;

a first expansion device disposed in the liquid line between the connection to the single compensator line and an outdoor heat exchanger;

a second expansion device disposed in the liquid line between the connection to the single compensator line and an indoor heat exchanger, the second expansion device configured to only act on refrigerant flowing towards the indoor heat exchanger; and wherein the compensator reservoir is operable to receive refrigerant, via the single compensator line, driven by pressure, from the liquid line, and further operable to allow refrigerant to flow back into the liquid line via the single compensator line.

2. The apparatus of claim 1, comprising a compensator valve disposed in the single compensator line.

3. The apparatus of claim 2, wherein the compensator valve comprises a solenoid valve.

4. The apparatus of claim 1, wherein the outdoor heat exchanger comprises a microchannel condenser.

5. The apparatus of claim 1, wherein the indoor heat exchanger comprises a microchannel evaporator.

6. The apparatus of claim 1, wherein the connection to the compensator reservoir is vertically higher than the connection to the liquid line.

7. The apparatus of claim 1, wherein the compensator reservoir is in an ambient environment of the outdoor heat exchanger.

8. The apparatus of claim 1, wherein the compensator reservoir is in an ambient environment of the indoor heat exchanger.

* * * * *